United States Patent
Ichihashi et al.

(10) Patent No.: US 10,151,400 B2
(45) Date of Patent: Dec. 11, 2018

(54) ELECTROMAGNETIC VALVE

(71) Applicant: DENSO CORPORATION, Kariya, Aichi-pref. (JP)

(72) Inventors: Katsuhiro Ichihashi, Okazaki (JP); Fumiaki Arikawa, Okazaki (JP); Naoki Mitsumata, Takahama (JP); Masahiro Watanabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 536 days.

(21) Appl. No.: 14/169,265

(22) Filed: Jan. 31, 2014

(65) Prior Publication Data

US 2014/0217317 A1    Aug. 7, 2014

(30) Foreign Application Priority Data

Feb. 6, 2013 (JP) .................................. 2013-21587

(51) Int. Cl.
| | |
|---|---|
| *F16K 1/34* | (2006.01) |
| *F16K 31/06* | (2006.01) |
| *F16K 31/40* | (2006.01) |
| *F02M 63/00* | (2006.01) |

(52) U.S. Cl.
CPC ............... *F16K 31/06* (2013.01); *F16K 1/34* (2013.01); *F16K 31/0665* (2013.01); *F16K 31/0696* (2013.01); *F02M 63/0012* (2013.01)

(58) Field of Classification Search
CPC .... F02M 59/466; F02M 63/0012; F16K 1/34; F16K 31/06; F16K 31/0665; F16K 31/0696
USPC ......................................... 251/129.02, 129.15
See application file for complete search history.

(56) References Cited

U.S. PATENT DOCUMENTS

| | | | | |
|---|---|---|---|---|
| 1,970,726 | A * | 8/1934 | Barrett ...................... | F16K 1/34 251/122 |
| 2,637,344 | A * | 5/1953 | Matthews ........... | F16K 31/0651 251/129.21 |
| 3,465,787 | A * | 9/1969 | Gulick ...................... | F16K 1/14 137/527 |
| 4,054,854 | A * | 10/1977 | Marsden ................. | F16K 31/06 335/255 |

(Continued)

FOREIGN PATENT DOCUMENTS

JP    2011-099563    5/2011

OTHER PUBLICATIONS

Office Action (2 pages) dated Apr. 21, 2015, issued in corresponding Japanese Application No. 2013-021587 and English translation (2 pages).

*Primary Examiner* — Seth W Mackay-Smith
(74) *Attorney, Agent, or Firm* — Nixon & Vanderhye PC

(57) ABSTRACT

An electromagnetic valve includes a driving portion, a valve body, and a valve element. The driving portion generates a magnetic attractive force according to an energization. The valve body has an orifice through which a fluid flows, and a valve seat around an opening portion of the orifice. The valve element displaces according to the magnetic attractive force and a fluid force that is applied from the fluid, to vary a passage area between the valve element and the valve seat. When the valve element is placed at a position separated farthest from the valve seat, the passage area between the valve element and the valve seat is less than or equal to a passage area of the orifice.

7 Claims, 4 Drawing Sheets

(56) References Cited

U.S. PATENT DOCUMENTS

| | | | | |
|---|---|---|---|---|
| 4,750,704 | A * | 6/1988 | Brundage | F16K 17/02 251/129.08 |
| 5,518,219 | A * | 5/1996 | Wenzel | F15B 13/0405 251/129.15 |
| 5,549,274 | A * | 8/1996 | Buchanan | F02M 59/466 251/129.14 |
| 5,626,325 | A * | 5/1997 | Buchanan | F02M 57/023 137/539.5 |
| 5,775,600 | A * | 7/1998 | Wildeson | F02M 51/0671 239/585.1 |
| 5,890,471 | A * | 4/1999 | Nishimura | F02M 45/12 123/467 |
| 6,254,199 | B1 * | 7/2001 | Megerle | B60T 8/363 137/550 |
| 6,409,102 | B1 * | 6/2002 | Luttrell | F02M 51/0614 239/585.1 |
| 6,439,265 | B1 * | 8/2002 | Gruschwitz | B60T 8/363 137/601.14 |
| 6,715,700 | B2 * | 4/2004 | Okamura | B60T 8/363 239/585.1 |
| 6,719,267 | B2 * | 4/2004 | Torii | B60T 8/363 137/596.17 |
| 6,834,667 | B2 * | 12/2004 | Sumiya | F02M 51/0671 137/15.18 |
| 7,168,679 | B2 * | 1/2007 | Shirase | B60T 8/363 251/129.02 |
| 7,438,276 | B2 * | 10/2008 | Yoshikawa | B60T 8/367 251/129.08 |
| 7,503,543 | B2 * | 3/2009 | Nomichi | F16K 31/082 251/129.15 |
| 7,703,709 | B2 * | 4/2010 | Akabane | F02M 51/005 123/472 |
| 7,931,252 | B2 * | 4/2011 | Shindo | F16K 1/34 251/318 |
| 7,938,381 | B2 * | 5/2011 | Takahashi | F16K 31/0665 251/122 |
| 8,220,776 | B2 * | 7/2012 | Tagata | B60T 8/363 251/129.02 |
| 8,350,651 | B2 * | 1/2013 | Shimizu | H01F 7/081 251/129.15 |
| 9,016,660 | B2 * | 4/2015 | Leventhal | B60T 8/363 251/129.02 |
| 2003/0057394 | A1 * | 3/2003 | Makino | F02M 55/025 251/129.06 |
| 2003/0067217 | A1 * | 4/2003 | Saenz | B60T 8/363 303/113.1 |
| 2011/0147624 | A1 * | 6/2011 | Schepp | F16K 31/0665 251/65 |
| 2012/0001107 | A1 * | 1/2012 | Tominaga | B60T 8/3615 251/129.15 |
| 2012/0211691 | A1 * | 8/2012 | Karl | B60T 8/363 251/333 |

* cited by examiner

ELECTROMAGNETIC VALVE

CROSS REFERENCE TO RELATED APPLICATION

This application is based on Japanese Patent Application No. 2013-021587 filed on Feb. 6, 2013, the disclosure of which is incorporated herein by reference.

TECHNICAL FIELD

The present disclosure relates to an electromagnetic valve which controls a position of a valve element according to a balance between a magnetic attractive force and a fluid force.

BACKGROUND

It is well known that a conventional electromagnetic valve in which a fluid is disposed around an opening portion of a passage hole at a valve seat, a valve element displaces according to a fluid force and a magnetic attractive force, and a passage area between the valve element and the valve seat varies. In this case, the valve seat is taper-shaped. According to JP-2011-99563A, a rod is taper-shaped. Since the valve element slides along the valve seat and displaces, an oscillation of the valve element is restricted, and a control safety is ensured.

However, since the valve element slides on a surface of the valve seat and displaces, a frictional resistance is generated between the valve element and the valve seat when the valve element is closed. Therefore, a required magnetic attractive force is increased, and a size of the electromagnetic valve is also increased. Further, since it is necessary to process the rod to a taper shape, man-hours are increased.

SUMMARY

An object of the present disclosure is to provide an electromagnetic valve in which an oscillation of a valve element is restricted, and the required magnetic attractive force is reduced.

According to an aspect of the present disclosure, the electromagnetic valve includes a driving portion, a valve body, and a valve element. The driving portion generates a magnetic attractive force according to an energization. The valve body has an orifice through which a fluid flows, and a valve seat around an opening portion of the orifice. The valve element displaces according to the magnetic attractive force and a fluid force that is applied from the fluid, to vary a passage area between the valve element and the valve seat. When the valve element is placed at a position separated farthest from the valve seat, the passage area between the valve element and the valve seat is less than or equal to a passage area of the orifice.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
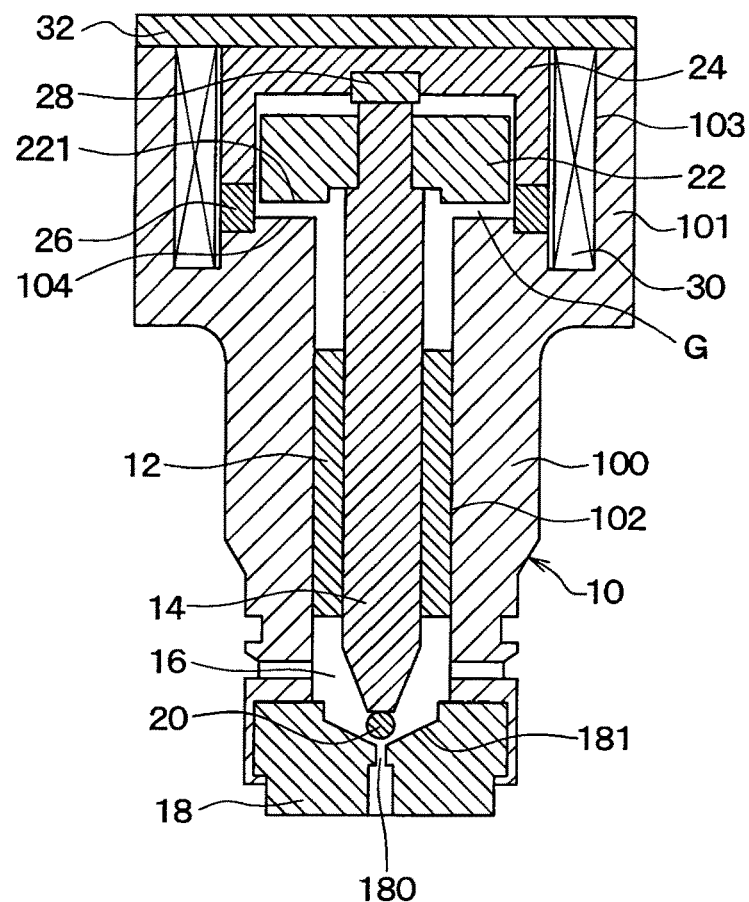
FIG. 1 is a sectional view showing an outline of an electromagnetic valve according to an embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiment

An embodiment of the present disclosure will be described. According to the embodiment, in an accumulator fuel injection device, an electromagnetic valve opens or closes a passage discharging a high-pressure fuel in a common rail to a low-pressure area so as to control a fuel pressure in the common rail. In this case, the fuel pressure in the common rail corresponds to a rail pressure.

Figure 2:
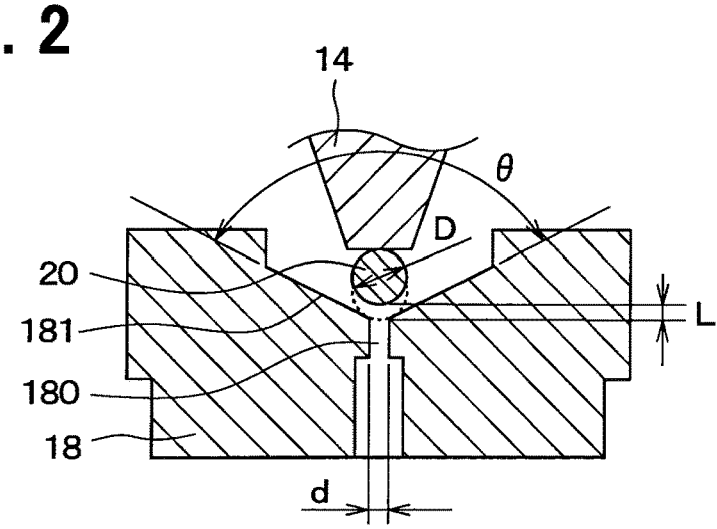
FIG. 2 is an enlarged view showing a part of the electromagnetic valve in FIG. 1.

As shown in FIGS. 1 and 2, the electromagnetic valve includes a housing 10 that is made of a magnetic metal. The housing 10 which is tube-shaped forms a magnetic circuit. The housing 10 has a first tube portion 100 and a second tube portion 101. Both the first tube portion 100 and the second tube portion 101 are tube-shaped, and are connected with each other in an axial direction of the housing 10.

The first tube portion 100 has a first hole 102 arranged at a center of the first tube portion 100 in a radial direction of the first tube portion 100. The first hole 102 corresponds to a tube-shaped space. The second tube portion 101 has a second hole 103. The second hole 103 has an inner diameter greater than that of the first hole 102. The second hole 103 corresponds to a tube-shaped space.

A sleeve 12 is arranged in the first hole 102. The sleeve 12 which is tube-shaped is made of a non-magnetic metal such as a stainless steel. A rod 14 is inserted into the sleeve 12 and is slidable in the sleeve 12. The rod 14 which is made of a metal is tube-shaped.

The sleeve 12 is shorter than the first hole 102 in the axial direction, and is arranged at an intermediate part of the first hole 102 in the axial direction. A space of the first hole 102, which is opposite to the second hole 103 with respect to the sleeve 12, is functioned as a passage 16 through which a fuel corresponding to a fluid flows. The passage 16 is connected with a tank that is not shown.

The first tube portion 100 has an end part opposite to the second tube portion 101. A valve body 18 which is tube-shaped is crimped to fix to the end part of the first tube portion 100. The valve body 18 has an orifice 180 arranged at an intermediate part in a radial direction of the valve body 18. The fuel flows through the orifice 180. The orifice 180 has a first end part communicating with the passage 16, and a second end part connected with the common rail that is not shown.

The valve body 18 further has a valve seat 181 adjacent to the passage 16. Further, the valve seat 181 around an opening portion of the orifice 180 is taper-shaped.

The rod 14 has a first end part close to the valve body 18. A valve element 20 is bonded to the first end part of the rod 14. The valve element 20 which is made of a metal is spherically-shaped. The valve element 20 moves together with the rod 14 in an axial direction of the rod 14, opens or closes the orifice 180, and varies a passage area between the valve element 20 and the valve seat 181. For example, the passage area may correspond to a sectional area of a surface perpendicular to a center axis of the valve body 18.

The rod 14 further has a second end part opposite to the valve body 18. An armature 22 is bonded to the second end part of the rod 14. The armature 22 which is made of a magnetic metal is tube-shaped, and forms the magnetic circuit. The armature 22 is arranged in the second hole 103.

The armature 22 has an armature pole surface 221 facing the first tube portion 100. The first tube portion 100 has a housing pole surface 104 facing the armature 22. The armature pole surface 221 and the housing pole surface 104 define a gap G.

The armature 22 is moved towards the housing pole surface 104 by a magnetic attractive force, and the rod 14 and the valve element 20 are moved towards the valve seat 181. Therefore, the electromagnetic valve is a normal-opening electromagnetic valve.

Hereafter, the rod 14, the valve element 20, and the armature 22 are referred to as movable members 14, 20 and 22.

In the second tube portion 101, a stator core 24 is arranged to face the armature 22. The stator core 24 which is made of a magnetic material is tube-shaped. The stator core 24 has a bottom and forms the magnetic circuit. The housing 10 and the stator core 24 are airtight bonded to each other by welding via a collar 26. The collar 26 which is ring-shaped is made of a non-magnetic metal such as a stainless steel.

The collar 26 limits a flow of a magnetic flux between the housing 10 and the stator core 24. Specifically, since a part of an inner peripheral surface of the collar 26 faces an outer peripheral surface of the armature 22, the magnetic flux bypasses the armature 22 and flows between the housing 10 and the stator core 24, and the magnetic flux is restricted.

A stopper 28 is arranged at the bottom of the stator core 24 to face the rod 14. The stopper 28 is made of a metal. Since the rod 14 abuts on the stopper 28, a movement range of the movable members 14, 20 and 22 towards the stator core 24 is limited.

Further, at least one of the rod 14 or the stopper 28 is made of a non-magnetic metal. Thus, when the rod 14 abuts on the stopper 28, the magnetic attractive force is not generated between the rod 14 and the stopper 28.

A coil 30 is arranged in the second tube portion 101 and is arranged radially outside of the stator core 24. The coil 30 which is tube-shaped generates a magnetic field when being energized. The second tube portion 101 has an end part opposite to the first tube portion 100. A retaining nut 32 is screwed with an end part of the second tube portion 101. The retaining nut 32 which is made of a magnetic metal is plate-shaped, and forms the magnetic circuit. A driving portion of the present disclosure is constructed by the housing 10, the stator core 24, the coil 30, and the retaining nut 32.

According to the present embodiment, when the valve element 20 is placed at a position separated farthest from the valve seat 181, the passage area between the valve element 20 and the valve seat 181 is referred to as a maximum passage area Afmax. In this case, the position corresponds to a maximum lift position. Further, a passage area of the orifice 180 is referred to as an orifice passage area Ao. A passage area of the valve seat 181 is referred to as a valve-seat passage area Af. Further, the valve-seat passage area Af is less than or equal to the orifice passage area Ao (Af/Ao≤1). The valve-seat passage area Af represents the passage area between the valve element 20 and the valve seat 181.

A maximum lift amount of the valve element 20 is referred to as L, an outer diameter of the valve element 20 is referred to as D, a tapered angle of the valve seat 181 is referred to as θ, and an inner diameter of the orifice 180 is referred to as d. The maximum passage area Afmax is computed according to formula (i), and the orifice passage area Ao is computed according to formula (ii). Further, the maximum lift amount L is set according to formula (iii), that is, Afmax/Ao≤1.

$$Af\max = \frac{1}{2}\pi L\sin\theta\left(D + L\sin\frac{\theta}{2}\right) \quad (i)$$

$$Ao = \frac{\pi}{4}d^2 \quad (ii)$$

$$L \leq \frac{-\pi D\sin\theta + \sqrt{\pi^2 D^2\sin^2\theta + 2\pi^2 d^2\sin\theta\sin\frac{\theta}{2}}}{2\pi\sin\theta\sin\frac{\theta}{2}} \quad (iii)$$

Next, an operation of the electromagnetic valve according to the present embodiment will be described.

The movable members 14, 20 and 22 are biased in a valve-opening direction according to a fluid force that is applied to the valve element 20 by the high-pressure fuel in the common rail. When the coil 30 is energized, the movable members 14, 20 and 22 are biased in a valve-closing direction according to the magnetic attractive force generated between the armature pole surface 221 and the housing pole surface 104.

When the coil 30 is deenergized, the magnetic attractive force is not generated. In this case, the movable members 14, 20 and 22 are driven at the maximum lift position by the fluid force, and the high-pressure fuel in the common rail is discharged to the tank via the orifice 180 and the passage 16. The maximum lift position corresponds to a completely opening position. The maximum passage area Afmax is set to hold the rail pressure to a predetermined value such as 20 MPa.

Then, when the magnetic attractive force is generated by energizing the coil 30, the magnetic attractive force cancels the fluid force to bias the movable members 14, 20 and 22 in the valve-closing direction. Further, in accordance with an increase in current flowing through the coil 30, the valve-seat passage area Af is decreased, and the rail pressure is increased.

Figure 3:
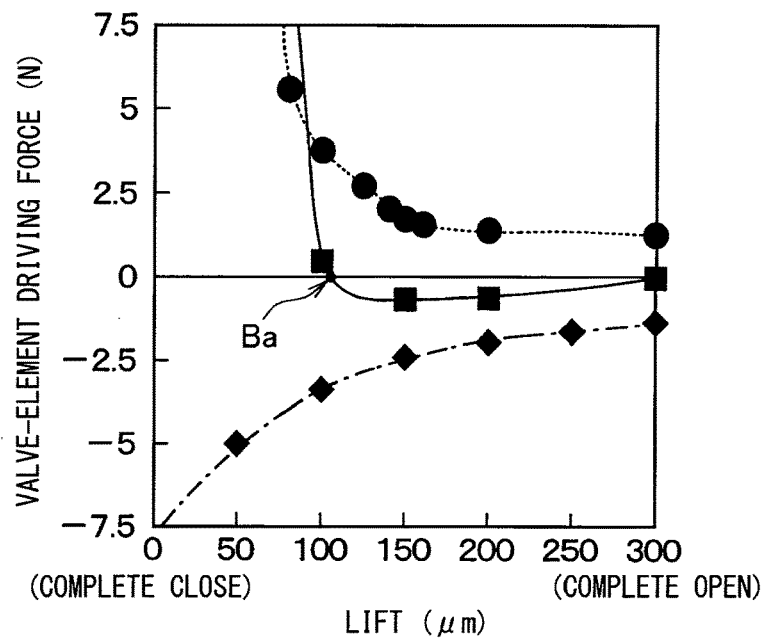
FIG. 3 is a graph showing a relationship between a valve-element driving force and a lift in an electromagnetic valve, according to a conventional example.

Here, a valve-opening operation of a conventional electromagnetic valve will be described. FIG. 3 is a graph showing a relationship between a valve-element driving force and a lift in the conventional electromagnetic valve that is a normal-opening electromagnetic valve. As shown in FIG. 3, a solid line represents the valve-element driving force, a dashed line represents the fluid force, and a dot-dash line represents a magnetic attractive force.

The valve-element driving force is a vectorial sum of the fluid force and the magnetic attractive force. The valve-element driving force, the fluid force, or the magnetic attractive force, is set to a positive value in a case where it is applied to the valve element 20 in the valve-opening direction, and is set to a negative value in a case where it is applied to the valve element 20 in the valve-closing direction.

Figure 4:
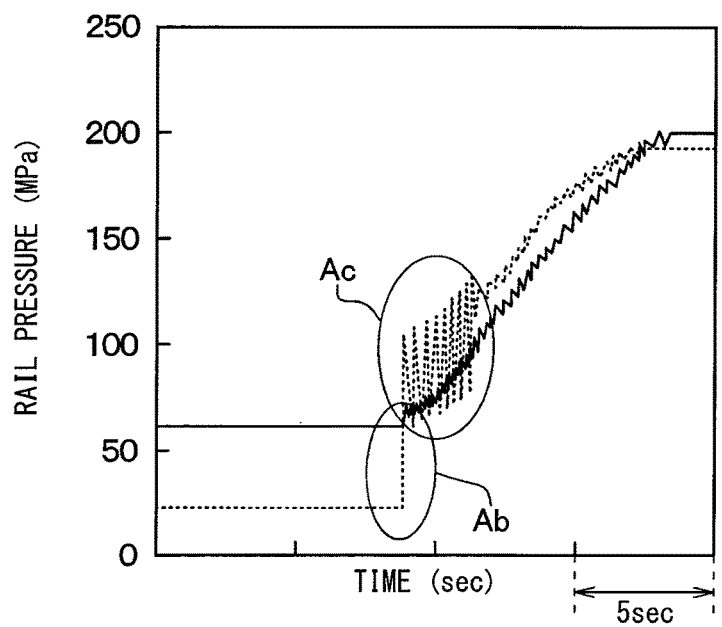
FIG. 4 is a graph showing a variation characteristic of a rail pressure in the electromagnetic valve according to the embodiment or in the electromagnetic valve according to the conventional example.

FIG. 4 is a graph showing a variation characteristic of the rail pressure when the coil 30 is energized. Specifically, a solid line represents a variation characteristic of the electromagnetic valve according to the present embodiment, and a dashed line represents a variation characteristic of the conventional electromagnetic valve in a condition that Afmax/Ao≥1.

As shown in FIG. 3, when the magnetic attractive force becomes greater than the fluid force by energizing the coil 30, the valve-element driving force becomes a negative value. The valve element 20 starts to displace in the valve-closing direction from the complete opening position, until the valve element 20 displaces to a balance point Ba at a small-lift area of the valve element 20. At the balance point Ba, the valve-element driving force is zero.

At a large-lift area of the valve element 20, the fluid force applying to the valve element 20 becomes significantly smaller, and a variation amount of the fluid force relative to a lift-varying amount of the valve element 20 also becomes smaller. The variation amount of the fluid force is referred to as a lift sensitivity of the fluid force. Thus, the valve element 20 displaces significantly and rapidly just after the coil 30 is energized. In other words, the valve element 20 abruptly displaces from the complete opening position to the balance point Ba.

Since the valve element 20 abruptly displaces from the complete opening position to the balance point Ba, the rail pressure rises sharply as an area Ab shown in FIG. 4. For example, the rail pressure may rise for a value from 10 MPa to 50 MPa. Further, an oscillation of the valve element 20 is generated due to a sharp displacement. Furthermore, when a small force is used to balance the fluid force and the magnetic attractive force, a force for attenuating the oscillation of the valve element 20 acts insufficiently. Therefore, the oscillation of the valve element 20 continues long, and a hunting of the rail pressure is generated as an area Ac shown in FIG. 4.

As the above description, the valve element 20 may be configured to not to generate the sharp displacement to restrict the oscillation of the valve element 20. The sharp displacement of the valve element 20 is generated because the lift sensitivity of the fluid force in the high-lift area is low. Since a flow passage is throttled at the orifice 180 and a fluid pressure is limited without depending on the lift, the lift sensitivity of the fluid force becomes low.

Figure 5:
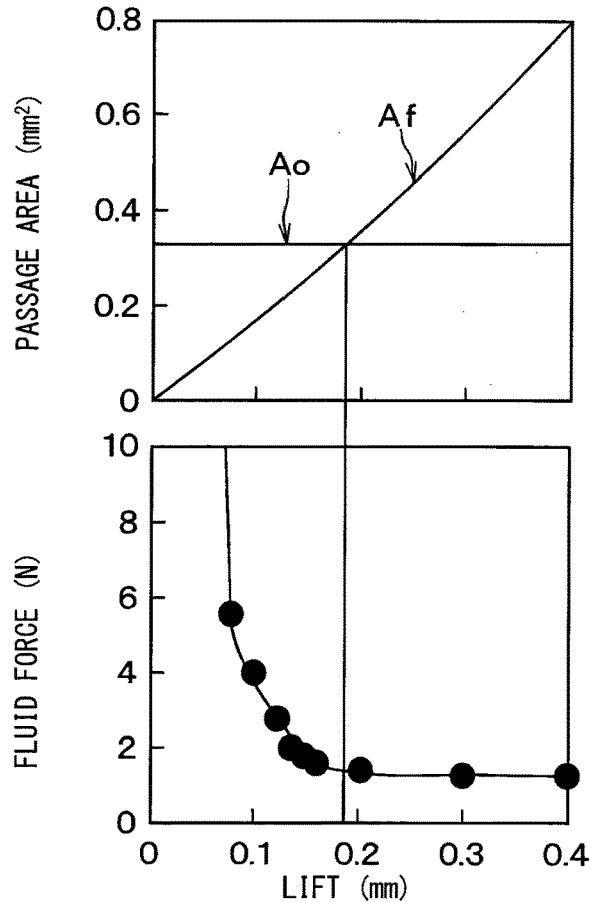
FIG. 5 is a graph showing a relationship between a fluid force, a passage area, and a lift.

To improve the lift sensitivity of the fluid force, the orifice passage area Ao may be increased to reduce a throttle operation of the orifice 180, or the maximum lift amount of the valve element 20 may be decreased to reduce the valve-seat passage area Af. FIG. 5 is a graph showing experimental results. At a lift area where Af/Ao≤1, the lift sensitivity of the fluid force is improved.

Figure 6:
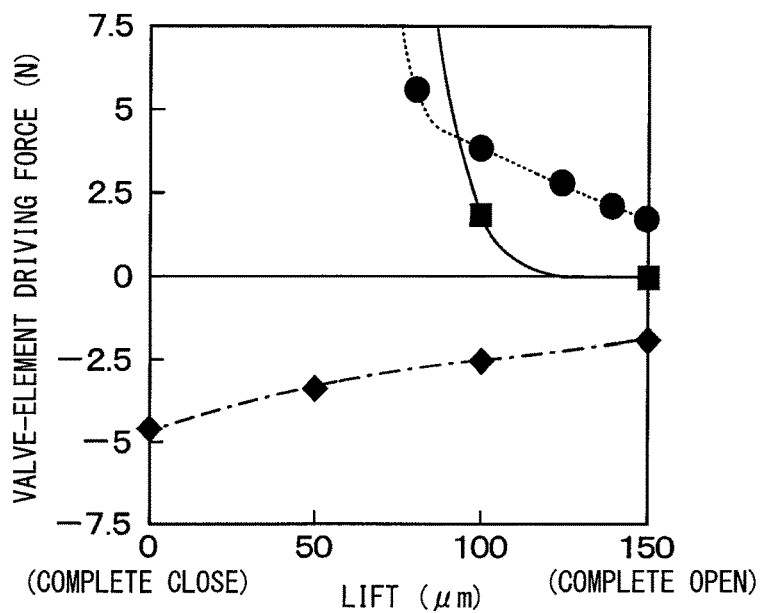
FIG. 6 is a graph showing a relationship between a valve-element driving force and a lift in the electromagnetic valve, according to the embodiment.

Next, the experimental results of the electromagnetic valve according to the present embodiment will be described. An experimental product is a normal-opening electromagnetic valve. For example, L is 0.15 mm, D is 1 mm, θ is 90, d is 0.65 mm, and Afmax/Ao is 0.8. FIG. 6 is a graph showing a relationship between a valve-element driving force of the experimental product and a lift. As shown in FIG. 6, a solid line represents the valve-element driving force, a dashed line represents a fluid force, and a dot-dash line represents a magnetic attractive force.

As shown in FIG. 6, when the valve element 20 is in the vicinity of the complete opening position, a lift sensitivity of the fluid force is improved. Therefore, the sharp displacement of the valve element 20 just after the coil 30 is energized can be prevented, and the oscillation of the valve element 20 is constricted. As a result, the hunting of the rail pressure just after the coil 30 is energized is not generated, as shown in FIG. 4.

As the above description of the present embodiment, since Afmax/Ao≤1, a large displacement of the valve element 20 due to a minute variation of the magnetic attractive force can be prevented, and the oscillation of the valve element 20 can be restricted.

Further, since the valve element 20 is not necessary to slide on the surface of the valve seat 181 or to displace during the valve element 20 is closed, a required magnetic attractive force can be reduced.

Moreover, since the rod 14 is not necessary to be processed to a taper shape, man-hours for processing the rod 14 can be reduced.

Figure 7:
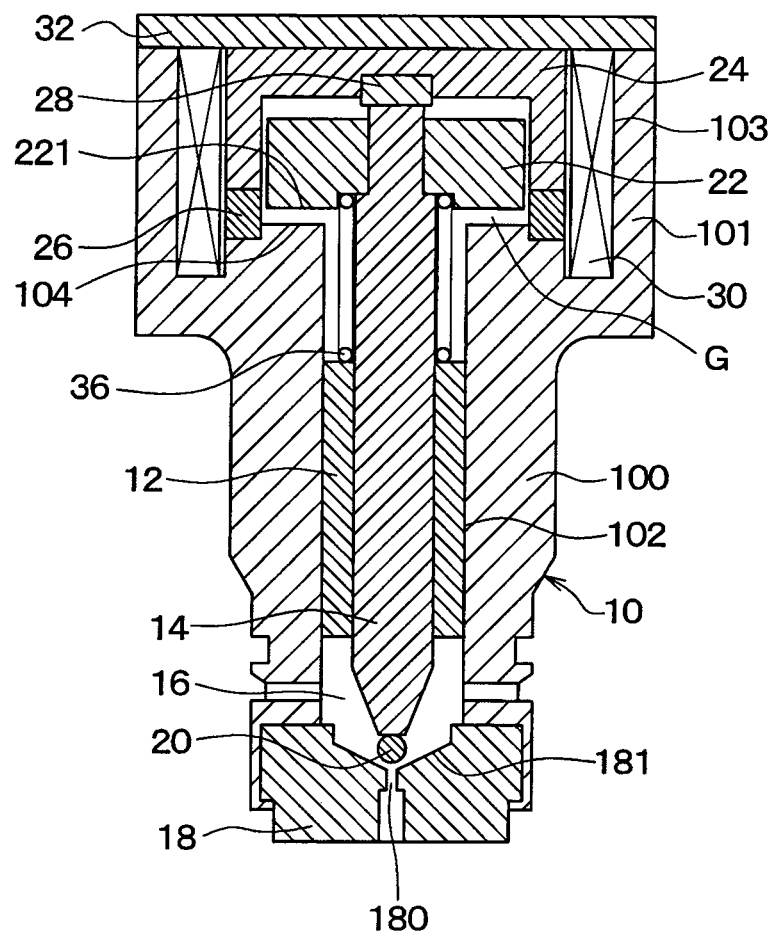
FIG. 7 is a sectional view showing a modification of the electromagnetic valve, according to the embodiment.

As shown in FIG. 7, a spring 36 may be used to bias the movable members 14, 20 and 22 in the valve-opening direction. In this case, positions of the movable members 14, 20 and 22 are controlled by a balance between a spring force of the spring 36, the fluid force, and the magnetic attractive force.

Other Embodiment

According to the above embodiment, the housing 10 and the valve body 18 are formed as different parts, and are integrally bonded to each other. The housing 10 and the valve body 18 may be formed as one part.

According to the above embodiment, the present disclosure is applied to a normal-opening electromagnetic valve. The present disclosure may be applied to a normal-closing electromagnetic valve.

According to the above embodiment, the present disclosure is applied to the electromagnetic valve in which the fuel pressure in the common rail is controlled. The present disclosure may be applied to an electromagnetic valve in which a fluid pressure is controlled.

The present disclosure is not limited to the embodiment mentioned above, and can be applied to various embodiments within the spirit and scope of claims of the present disclosure.

According to the above embodiment, elements for constituting the above embodiments are not necessary except the element is clearly essential.

According to the above embodiment, a value is used for describing a number of the element, a value of the element, an amount of the element, or a range of the element is not limited to a specified value except this value is clearly essential.

According to the above embodiment, a shape of the element or a relationship between the elements is not limited except a specified shape of the element or a specified relationship between the elements is clearly essential.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electromagnetic valve comprising:
    a driving portion generating a magnetic attractive force according to an energization;
    a valve body having
        an orifice through which a fluid flows, and
        a valve seat around an opening portion of the orifice; and
    a valve element displacing according to the magnetic attractive force and a fluid force that is applied from the fluid, to vary a passage area between the valve element and the valve seat, wherein
    the passage area between the valve element and the valve seat is less than or equal to a passage area of the orifice, when the valve element is placed at a maximum lift position that is separated farthest from the valve seat in a case where the valve element abuts on a stopper limiting a movement range of the valve element, and
    the stopper is arranged on an end surface of the driving portion opposite to the valve element.

2. The electromagnetic valve according to claim 1, further comprising
    a spring biasing the valve element, wherein
    a position of the valve element is controlled by a balance between a spring force of the spring, the fluid force, and the magnetic attractive force.

3. The electromagnetic valve according to claim 1, wherein
    the valve element is biased towards the valve seat according to the magnetic attractive force.

4. The electromagnetic valve according to claim 1, wherein
    the passage area between the valve element and the valve seat when the valve element is placed at the maximum lift position separated farthest from the valve seat is determined based on a maximum lift amount of the valve element, an outer diameter of the valve element, and a tapered angle of the valve seat.

5. The electromagnetic valve according to claim 4, wherein
    the passage area of the orifice is determined based on an inner diameter of the orifice.

6. The electromagnetic valve according to claim 1, wherein
    at least one of the valve element or the stopper is made of a non-magnetic metal.

7. The electromagnetic valve according to claim 1, further comprising:
    a collar disposed in the driving portion to be bonded to the driving portion, the collar being ring-shaped and made of a non-magnetic metal.

* * * * *